United States Patent [19]

Samuelsson et al.

[11] Patent Number: 5,112,812
[45] Date of Patent: May 12, 1992

[54] PEPTIDE PREPARATION, A PROCESS FOR PRODUCING IT AND USE OF THE PEPTIDE PREPARATION

[76] Inventors: Ernst-Gunnar Samuelsson, Magnoliavej 40, DK-2000 Frederiksberg; Otto M. Poulsen, Laasbyvej 19, DK-2610 Rodovre, both of Denmark

[21] Appl. No.: 728,322
[22] PCT Filed: Dec. 18, 1986
[86] PCT No.: PCT/DK86/00135
 § 371 Date: Oct. 16, 1987
 § 102(e) Date: Oct. 16, 1987
[87] PCT Pub. No.: WO87/03786
 PCT Pub. Date: Jul. 2, 1987

Related U.S. Application Data

[63] Continuation of Ser. No. 138,036, Oct. 16, 1987, abandoned.

[30] Foreign Application Priority Data

Dec. 18, 1985 [DK] Denmark ............................ 5897/85

[51] Int. Cl.$^5$ ................................................ C07K 7/10
[52] U.S. Cl. ...................................... 514/21; 435/68.1; 530/343; 530/407; 530/833
[58] Field of Search .................. 530/343, 407, 833; 435/69; 514/21

[56] References Cited

U.S. PATENT DOCUMENTS 4,107,334 8/1978 Jolly .................................. 426/7
4,293,571 10/1981 Olofsson et al. ................... 426/7

FOREIGN PATENT DOCUMENTS 0022019 1/1981 European Pat. Off. .
0033694 8/1981 European Pat. Off. .
0065663 12/1982 European Pat. Off. .............. 435/69

OTHER PUBLICATIONS

Liu, C. et al, "Immunochemical Studies of the Tryptic, Chymotryptic and Peptic Peptides of Heat Denatured Bovine Serum Albumin", *Immunochemistry*, Pergamon Press 1967, vol. 4, pp. 1-10.

Otani, H. et al, "Studies on the Antigenicity of the Browning Product between β-Lactoglobulin and Lactose: Antigenic Activities of Peptides Obtained by Cleavage at Arginine Peptide Bonds in Regions 25-107 and 108-145", Jpn. J. Zootech. Sci., 56 (12): pp. 987-993.

Otani, H. et al, "Contribution of the Sugar Moiety in the Browning Product between β-Lactoglobulin and Lactose as an Antigenic Determinant", Jpn. J. Zootech. Sci., 53 (5): pp. 344-350.

Matsuda, T. et al, "Immunochemical Properties of Proteins Glycosylated Through Maillard Reaction: β-Lactoglobulin-Lactose and Ovalbumin-Glucose Systems", Journal of Food Science, vol. 50 (1985), pp. 618-621.

*Primary Examiner*—Lester L. Lee
*Attorney, Agent, or Firm*—Fleit, Jacobson, Cohn, Price, Holman & Stern

[57] ABSTRACT

A peptide preparation from hydrolysis of whey containing peptides with a molecular weight of up to 6,000 Dalton. Such a preparation is hypoallergenic and therefore useful in food products and stimulants, such as mother's milk substitutes, edible ice, protein beverages and other products, usually containing milk or milk protein, in particular for allergics or humans with lactose malabsorption. The preparation is produced by a combination of enzymatic hydrolysis and ultra filtration.

21 Claims, No Drawings

PEPTIDE PREPARATION, A PROCESS FOR PRODUCING IT AND USE OF THE PEPTIDE PREPARATION

This application is a continuation of application Ser. No. 138,036, filed Oct. 16, 1987, now abandoned.

The present invention concerns a peptide preparation from hydrolysis of whey, a process for producing it by ultrafiltration and hydrolysis of whey as well as use of the peptide preparation as a substitute for milk or milk protein.

In the population there are increasing problems with allergy, i.e. milk allergy, just as there are some people who cannot absorb lactose. The problems are particularly great in case of infants, since milk and milk products constitute a significant proportion of their nutrition if they are not breast-fed for some reason.

It has been attempted to produce mother's milk substitutes from e.g. whey by a combination of enzymatic hydrolysis, heat treatment and ultrafiltration, cf., the U.S. Pat. No. 4,293,571. The peptides obtained hereby have a size of 1,000–10,000 Dalton. However, it is well-known that peptides of 5,000–10,000 Dalton are often allergenic, see e.g. Immunochemistry, Pergamon Press 1967, 4, p. 1–10.

The process described in the mentioned U.S. patent comprises denaturation of the proteins, which is performed by a heat treatment, e.g. at 100°–140° C. for from 10 seconds to 4 minutes or at 75°–100° C. for 2–60 minutes. Such a strong denaturation involves a great risk of destruction of sulfur-containing amino acids, formation of Maillard reaction products which are often allergenic (hapten effect), just as the taste of the product is impaired. See e.g. Otani, H. and Tokita, F., Jap. J. Zootechn. Sci., 1982, 53, p. 344, Otani et al., Jap. J. Zootechn. Sci., 1985, 56, p. 987 and Matouda, T. et al., J. Food Sci., 1985, 50 p. 618.

It has now been found that if a whey-based peptide preparation comprising peptides with a molecular weight of up to 6,000 Dalton is provided, it may be incorporated as a component in food products and stimulants for allergics. The preparation is useful in mother's milk substitutes for infants as well as in food products and stimulants for persons liable to develop allergy, persons with lactose malabsorption, as a liquid diet for patients having gone through gastric/intestinal surgery, as well as a protein source for athletes, in particular weight lifters, throwers and bodybuilders. It is useful in stimulants such as ice and protein beverages.

Thus, the preparation of the invention is characterized by comprising peptides with a molecular weight of up to 6,000 Dalton and by being free of allergenic substances, such as Maillard reaction products and lactose.

A particularly preferred peptide preparation is characterized by substantially consisting of peptides with a molecular weight of 2,000–6,000 Dalton, in particular 2,000–2,500 Dalton, since small molecules, such as free amino acids and salts tend to cause diarrhoea because of their osmotic effect, which is undesirable of course.

The invention also concerns a process for producing the present peptide, which is characterized by a) diafiltrating essentially casein-free whey with water on an about 20,000 Dalton membrane, if desired after a preceding concentration of the whey, b) enzymatically hydrolyzing the whey protein retentate from a) in one or more steps, each hydrolysis step being terminated with ultrafiltration through an about 6,000 Dalton membrane to harvest the resulting peptides in the permeate.

If the whey as a starting material is not essentially casein-free, it must, prior to performing the process of the invention, be subjected to coarse filtration, centrifugation or other treatment for removal of casein residues which may perhaps be present as complexes. The whey is expediently purified on a 200,000 Dalton membrane, i.e. a membrane with a cut-off value of 200,000 Dalton, or by a pH adjustment to about 4.6 and addition of a precipitant, preferably calcium chloride. Any membrane with the desired cut-off value may be used here and throughout the description and claims. Usually, commercially available membranes are preferred, produced from high-resistant synthetic polymers which are also useful for clean-in place, CIP cleaning, i.e. cleaning on site, with e.g. acid and lye. Such membranes are available e.g. from DDS, De Danske Sukkerfabriker, Rhone-Poulenc and Romicon. The membranes used in the examples are from DDS.

The EP patent application No. 65663 discloses a process for producing a protein hydrolysate useful as a food for patients on an enteric diet. The process comprises hydrolysis of a whey protein suspension with a lactose content of no more than 1.0% by weight with a protease from *Aspergillus niger*, preferably after a basic prehydrolysis at 90°–95° C. If desired, a bacterial protease from *Bacillus licheniformis* may also be used. The suspension is heat treated after the hydrolysis, typically to 90° C. to inactivate the enzyme or enzymes.

Such a product will have a considerable proportion of substances will a molecular weight below 2,000 and will therefore tend to cause diarrhoea. Further, there will be a non-negligible content of proteins with a molecular weight above 6,000 which are allergenic. In particular, the heat treatment for inactivating the enzymes will cause Maillard reaction products with a hapten effect.

Conclusively, the described hydrolysis will therefore not be suitable for use as a milk substitute for milk allergics and infants, just as it does not appear to be useful for humans who cannot tolerate lactose.

Further, the EP patent specification No. 33694 discloses a process for producing a stable hydrolysate of animal proteins, wherein the protein hydrolysate is mixed with a liquid milk product, e.g. a retentate from ultrafiltration of milk in amounts of at least 50% based on the stabilized protein hydrolysate.

The stabilized hydrolysates are intended for dietetic nutrition of sick people and malnutritioned and undernourished people, but cannot readily be tolerated by milk allergics and humans with lactose malabsorption.

By omitting a denaturing heat treatment as described in the U.S. Pat. No. 4,293,571 and the EP patent application 65663 and otherwise proceeding according to the process of the invention, a product will be obtained which is hypoallergenic and lactose-free.

The EP patent application No. 22019 admittedly describes a total enzymatic whey protein hydrolysate essentially free of residual proteins, defined by having no content of fractions which can be precipitated with 12% trichloroacetic acid. At least 50% of the peptides contains 2–5 amino acids, while the content of free amino acids is lower than 15%. Preferably, 70–90% of the peptides has a chain length below 10.

The products are repeated to be useful as food products, in particular post-surgery treatments with a view to re-establishing the metabolism as they may be absorbed directly through the intestinal wall and stimulate the enzyme production. Nothing is said about allergy problems, lactose malabsorption, nutrition of infants, i.e. the phenomena on which the proposed uses of the peptide preparation of the invention are based in particular, and the stated limitation criteria are not sufficient to ensure a hypoallergenic and lactose-free product.

The recovery of the hydrolysate takes place by a method having certain points of similarity to the process of the invention, since it involves enzymatic hydrolysis of an optionally ultrafiltrated and/or diafiltrated whey protein to the desired low molecular sizes, and collection of the desired hydrolysate by ultrafiltration without intermediate enzyme inactivation. However, the enzyme used is obligatory an enzyme capable of re-establishing the human protein metabolism, preferably pancreatin which is a mixture of particularly trypsin and chymotrypsin.

However, as mentioned, the patent application is silent on the uses of the molecular sizes critical to the usefulness of the preparation of the invention, just as it does not describe the combination of several enzymes by the hydrolysis.

According to a preferred embodiment of the process of the invention, the starting material used is whey from acid-precipitated casein. This results in a better taste than with e.g. whey from cheese production which, because of a certain content of casein, including kappa casein, tends to give a bitter taste which may be difficult or impossible to remove.

The hydrolysis may be performed with various proteases, all of which—depending upon the quality and production conditions of the starting materials—can give a satisfactory peptide preparation. The hydrolysis may be followed continuously by the pH-stat method, and the degree of hydrolysis is calculated on the basis of the consumption of NaOH in the usual manner. The degree of hydrolysis is stated as the percentage proportion of cleaved peptide bonds in relation to the total number of peptide bonds, cf. J. Adler-Nisson: J. Chem. Technol. Biotechn, 32.138, 1982. The proteases are not inactivated prior to ultrafiltration. Virtually all proteases acceptable in the food industry may be used. Examples of particularly useful enzymes include enzymes from *Aspergillus oryzae*, such as "Rhozyme 41 PC", and from *Bacillus licheniformis*, such as "Alcalase ® 0.6 L" and "Corolase PP" (pancreas extract). "Rhozyme 41 PC" contains leucine aminopeptidases which hydrolyze bitter peptides and is thus useful for the treatment of whey containing small amounts of bitter substances. The hydrolysis is preferably performed in one or more steps with intermediate ultrafiltration(s). This results in a better yield and a better molecular weight distribution.

I. PROCESSING OF WHEY PROTEIN

As mentioned, the best starting material is whey from acid precipitated casein. It is also possible to use whey from cheese production. The latter whey contains varying amounts of casein. Only whey containing small amounts of casein can be used since hydrolysis of casein leads to bitter substances, which may be difficult or impossible to remove. As mentioned, the whey is freed of any residues of casein, e.g. by course filtration (200,000 Dalton), and/or by acid addition, preferably to a pH of about 4.6, and addition of a precipitant, preferably $CaCl_2$, in particular in an amount of 5–40 g/100 l whey and subsequent removal of the casein e.g. by decanting. Then, the permeate containing whey proteins may be concentrated (20,000 Dalton) to reduce the amount of liquid to be treated. High flow rates are obtained at a pH of 2.0–2.5. The concentrate is diafiltrated with water to remove lactose, increase pH and concentrate the protein content to 0.5%–20%. The production of lactose-free whey protein concentrate, WPC, may be effected continuously. The production proceeds most expediently either cooled to about 5° C. or heated to about 50° C. to prevent microbial growth, if the whey from acid-precipitated casein or acid and $CaCl_2$ treated whey only has an insignificant content of casein, coarse filtration of the starting material is superfluous.

II. PRODUCTION OF HYDROLYSATES

Whey protein concentrate may be hydrolyzed with various proteases, all of which can give a satisfactory peptide preparation, depending upon the quality and product conditions of the starting material, as mentioned. The hydrolysis may be followed continuously and the degree of hydrolysis is calculated on the basis of the consumption of NaOH. The minimum degrees of hydrolysis to be obtained are stated below. The proteases are not inactivated prior to ultrafiltration.

IIa. HYDROLYSIS WITH TWO ENZYMES

First, 5% whey protein concentrate is hydrolyzed at 50° C. and pH 7.5 with 1.0 g "Rhozyme 41 PC" (*Aspergillus oryzae*—Genencore) per liter of substrate to 9% hydrolysis. Ultrafiltration is performed on a 6,000 Dalton membrane.

The yield of peptide in the UF permeate constitutes 30–40% of the initial protein amount.

Then the retentate from ultrafiltration of the "Rhozyme" hydrolysate is further hydrolyzed at 50° C. and pH 7.5 with 0.5 ml of "Alcalase ® 0.6 L" (*Bacillus licheniformis*—NOVO) per liter of substrate (start volume at the first hydrolysis). The hydrolysis is continued to 12%. The yield of peptide in the UF permeate is 40–45% of the initial protein amount. The total yield is 70–80%.

The sequential hydrolysis increases the overall yield. The intermediate ultrafiltration is used for harvesting peptides formed in the first hydrolysis, which would otherwise be hydrolyzed further to free amino acids with a resulting higher osmolarity of the product.

IIb. COMBINED HYDROLYSIS WITH TWO ENZYMES

Advantageously both enzymes are used in one step, since this leads to an improved yield and the intermediate harvesting is avoided.

IIc. HYDROLYSIS WITH "COROLASE PP"

Whey protein concentrate may also be hydrolyzed with "Corolase PP" (pancreas extract—Rohm) at 50° C. and pH 8.0 (5.0 g per kg of whey protein concentrate) to 10% hydrolysis. However, this requires casein-free whey protein concentrate to avoid formation of bitter peptides. A yield of 50–60% peptides in the UF permeate is obtained.

IId. HYDROLYSIS WITH "ALCALASE 0.6 L"

5% whey protein concentrate may be hydrolyzed at 50° C. and pH 7.5 with "Alcalase ® 0.6 L" (1.0 ml per liter of substrate) to 18% hydrolysis. The yield of peptide in the UF permeate is about 80%. However, the method can only be used on essentially casein-free whey protein since casein leads to formation of bitter peptides.

III. HARVEST OF PEPTIDES

The hypoallergenic peptides are harvested from the hydrolysates by ultrafiltration and/or diafiltration, a combination being often preferred since fouling during filtration reduces the permeability of the filter.

The peptides produced by the process of the invention may be used in various food products and stimulants as mentioned. Thus, mother's milk substitutes may be produced by adjusting the protein content in the harvested UF permeate to 3.0%, adding salts, vitamins, saccharose, starch and fat, and then the mixture is emulsified, concentrated, sterilized and atomization-dried to provide a finished product to be diluted when used. It is also possible to produce a liquid concentrate or a product ready for use, in a manner known per se.

The invention will be explained more fully by means of the following examples:

EXAMPLE 1

Production of mother's milk substitutes on the basis of whey from acid-precipitated casein 500,000 liters of casein-free whey from acid-precipitated casein with a protein content of 0.5% are pre-treated by coarse filtration on "GR30PP" membranes (200,000 Dalton). Then the whey proteins are concentrated and diafiltrated on "GR61PP" membranes (200,000 Dalton). The resulting retentate is free of lactose. The retentate is then fed to a tank equipped with a heat jacket to keep a constant temperature of 50° C. The pH of the whey protein concentrate is adjusted to 8.0 with the pH meter/titrator unit used in the hydrolysis to keep a constant pH of about 8.0. The consumption of NaOH is used as a measure of the degree of hydrolysis. The tank is moreover equipped with an efficient stirrer. When the whey protein concentrate has been equilibrated at 50° C. and pH 8.0, 1.23 kg of "Corolase PP" are added, and the hydrolysis proceeds until about 40 liters of 4.0 N NaOH (10% hydrolysis) have been consumed. This takes about 4 hours. Then the hydrolysate is ultrafiltrated/diafiltrated on "GR81PP" membranes (6,000 Dalton) to provide a hypoallergenic permeate. The protein content in the permeate is measured continuously at 280 nm. The protein content in the permeate is 2.5 to 3.0%. 125 kg of hypoallergenic peptide are obtained, corresponding to 1,000 kg of complete mother's milk substitute.

EXAMPLE 2

Production of hypoallergenic peptide on the basis of whey from cheese production 19,200 liters of whey from cheese production with a protein content of about 0.65% are coarse filtrated as in example 1, or treated with an acid and CaCl$_2$, as stated before. The permeate, constituting whey cleaned of particulate casein, but containing kappa casein, is fed to another tank and concentrated/diafiltrated as in example 1. Then the retentate constitutes lactose-free whey protein concentrate. The whey protein concentrate is adjusted to pH 7.5 and 50° C., and 2.5 kg of "Rhozyme 41 PC" are added. The hydrolysis is continued until about 18 liters of 4.0 N NaOH (9% hydrolysis) have been consumed, which takes about 2 hours. The hydrolysate is ultrafiltrated/diafiltrated as stated in example 1. The yield of peptides in the permeate is about 35%. The retentate is adjusted to pH 7.5 and 50° C., and 1.25 liters of "Alcalase ® 0.6 L" are added. The hydrolysis is continued until about 15 liters of 4.0 N NaOH (12% hydrolysis of the retentate) have been consumed, which takes about 2 hours. The "Alcalase 0.6 L" hydrolysate is filtrated/diafiltrated as stated in example 1. The yield of peptides in the UF permeate is about 35% of the whey protein concentrate amount. The protein content in the total UF permeate after hydrolysis with the two enzymes will be below 1.0%, and the UF permeate is therefore concentrated 4–5 times before it is suitable for use in the production of mother's milk substitutes. 90 kg of hypoallergenic peptide are obtained, corresponding to 760 kg of complete mother's milk substitute.

EXAMPLE 3

60,000 liters of whey from cheese production having a protein content of 0.85% is pre-treated by lowering of pH to 4.6 and precipitation with CaCl$_2$. Precipitated casein is removed by decanting, and the liquid having a protein content of 0.70% is diafiltrated so that the lactose content is reduced to max. 0.1%, and then the protein content is adjusted to 5%. This retentate is heat-treated at 70° C. for 10 minutes to inactivate rennet, and then "Rhozyme" and "Alcalase ® 2.4 L" are added simultaneously in amounts corresponding to E/S 2 and 1.36%, respectively. The hydrolysis is performed at a pH of 7.5 and at 55° C., and pH is kept at 7.5 with a pH-stat during the hydrolysis.

A degree of hydrolysis of about 17% is obtained after about 4 hours, and then the mixture is ultrafiltrated on a membrane with a cut-off value of 6,000.

About 4,500 liters of permeate having a protein content of about 3.5% is obtained. This is processed by addition of carbohydrates, vitamins, fat and minerals in accordance with the regulations in this field to provide a hypoallergenic lactose-free preparation, which may be further processed by sterilisation and/or spray-drying.

When using two tanks, the process may be performed continuously as hydrolysis may take place in one tank, while ultrafiltration/difiltration of whey protein takes place in the other tank. The process described in example 1 is considerably less expensive with respect to consumption of enzymes and requirement of apparatus than the process described in example 2. On the other hand, the requirements made of the quality (and thus price) of the optionally concentrated whey used as the starting material are lower in example 2, just as the yield in example 2 is higher than in example 1. An even higher yield may be obtained by a process corresponding to example 1 by using a thorough hydrolysis with "Alcalase 0.6 L". However, this process is very exacting with respect to the whey, which, as mentioned, must be essentially free of casein. At present the process according to example 3 is preferred, due to its conveniency and the excellent quality of the product, which is both hypoallergenic, lactose-free and of attractive taste.

The products produced by the process of the invention show no allergenicity according to measurements, no antibody binding being observed in ELISA using the following antibodies:

I. Commercial rabbit antibodies, produced by the applicants, against casein or whey protein.

II. Sera from cow's milk allergic patients containing human antibodies against milk proteins.

Moreover, they cannot cause PCA reaction in mica passively sensitized with rabbit or mouse antibody against milk proteins, they cannot cause positive reaction in in vitro Histamin-Release tests using patient sera as stated in the foregoing, and they do not cause allergy reactions in provocation tests on infants with clinically well-documented milk allergy. The peptides have an optimum content of essential amino acids and thus a high nutritional value, just as the product is lactose-free. A 1.5% aqueous solution of the peptides is tasteless and odorless. The peptides in an up to 10% aqueous solution are soluble at pH 4,5. At this pH the peptides tolerate boiling for 10 minutes. As mentioned, the peptides have a size below 6,000 Dalton, and most of them have a molecular weight of 2,000-2,500 Dalton. They have no or a very weak emulsifying capability, just as they are sparingly foaming with a poor foam stability. They are therefore useful as a substitute for milk, as mentioned in the foregoing.

We claim:

1. A hypoallergenic and substantially lactose-free composition, comprising peptides that are derived from the hydrolysis of substantially casein-free whey, wherein said composition is substantially lactose-free and the peptides that are derived from whey, have a maximum molecular weight of about 6,000 Daltons, whereby said composition contains substantially no substances that would cause an allergic reaction in an individual who is allergic to milk.

2. The composition of claim 1, wherein substantially all of said peptides have molecular weights between 2,000-6,000 Daltons.

3. A process for producing a substantially lactose-free hypoallergenic peptide composition derived from whey, comprising:
   (a) diafiltering substantially casein-free whey with water to produce a filtrate and a substantially lactose-free whey concentrate, wherein said diafiltration is effected with a membrane that has a molecular weight cut-off of about 20,000 Daltons and substantially all of the lactose is removed from said whey concentrate;
   (b) enzymatically hydrolyzing said whey protein concentrate; and
   (c) ultrafiltering said hydrolyzed protein using a membrane that has a molecular weight cut-off of about 6,000 Daltons, whereby said hydrolysis reaction is terminated and the filtrate, which contains peptides that have molecular weights of 6,000 Daltons or less, is hypoallergenic.

4. The process of claim 3, wherein said casein-free whey is produced by acid precipitation of the casein.

5. The process of claim 3, wherein said substantially casein-free whey is prepared by coarse filtration, whereby substantially all of the casein in said whey is removed.

6. The process of claim 3, wherein said enzymatic hydrolysis is effected in two steps using a different enzyme at each step.

7. The process of claim 3, wherein said hydrolysis is effected by one or more proteases.

8. The method of claim 3, wherein the lactose concentration in said whey concentrate is less than about 0.1%.

9. The composition of claim 1, wherein substantially all of said peptides have molecular weights between 2,000-2,500 Daltons.

10. The method of claim 3, wherein prior to said difiltration said whey is concentrated.

11. The process of claim 5, wherein said coarse filtration is effected by filtration through a membrane that has a molecular weight cut-off of 200,000 Daltons.

12. The process of claim 4, wherein said acid precipitation is effected by acidifying whey and then adding sufficient calcium chloride to precipitate all of the casein in said whey.

13. A milk substitute suitable for ingestion by lactose intolerant individuals and individuals allergic to milk, comprising the composition of claim 1.

14. A food product containing the milk substitute of claim 13 in place of any milk that is normally used in said product.

15. The method of claim 3, wherein said hydrolysis is effected with one or more enzymes.

16. The method of claim 3, further comprising collecting the filtrate.

17. The method of claim 3, further comprising repeating steps b) and c) a plurality of times.

18. The method of claim 17, wherein hydrolysis is effected with different enzymes each time steps b) and c) are repeated.

19. The method of claim 3, wherein said enzymes are selected from the group consisting of proteases.

20. The method of claim 19, wherein said protease is a leucine aminopeptidase that is isolated from *Aspergillus oryzae* or is a protease that is isolated from *Bacillus licheniformis*.

21. The process of claim 18, wherein steps (b) and (c) are repeated twice using a leucine aminopeptidase that is isolated from *Aspergillus oryzae* and a protease that is isolated from *Bacillus licheniformis*.

* * * * *